(12) United States Patent
Hand, III et al.

(10) Patent No.: US 6,834,458 B1
(45) Date of Patent: Dec. 28, 2004

(54) FEEDING FLOCK DECOY ASSEMBLY

(75) Inventors: Howard J. Hand, III, Clarksville, TN (US); Comer A. Davis, Biggers, AR (US)

(73) Assignee: Ebsco Industries, Inc., Birmingham, AL (US)

( * ) Notice: Subject to any disclaimer, the term of this patent is extended or adjusted under 35 U.S.C. 154(b) by 0 days.

(21) Appl. No.: 10/360,129

(22) Filed: Feb. 6, 2003

(51) Int. Cl.⁷ .............................................. A01M 31/06
(52) U.S. Cl. .................................................. 43/3; 43/2
(58) Field of Search ........................ 43/2, 3; 446/228, 446/229

(56) References Cited

U.S. PATENT DOCUMENTS

| | | | | |
|---|---|---|---|---|
| 1,831,286 A | * | 11/1931 | Chelini | 43/3 |
| 2,547,286 A | * | 4/1951 | Sabin | 43/3 |
| 2,624,144 A | * | 1/1953 | Beverman | 43/3 |
| 2,663,108 A | * | 12/1953 | Dixon et al. | 43/3 |
| 2,726,469 A | * | 12/1955 | Becker | 43/3 |
| 2,752,715 A | * | 7/1956 | Miller | 43/3 |
| 4,910,905 A | * | 3/1990 | Girdley et al. | 43/3 |
| 4,965,953 A | * | 10/1990 | McKinney | 43/2 |
| 5,036,614 A | * | 8/1991 | Jackson | 43/3 |
| 5,168,649 A | * | 12/1992 | Wright | 43/2 |
| 5,375,363 A | * | 12/1994 | Higdon | 43/3 |
| 5,459,958 A | * | 10/1995 | Reinke | 43/2 |
| 5,974,720 A | * | 11/1999 | Bowling | 43/3 |
| 6,357,159 B1 | * | 3/2002 | Bowling | 43/2 |
| 6,408,558 B1 | * | 6/2002 | Cornell et al. | 43/2 |
| 6,574,902 B1 | * | 6/2003 | Conger | 43/2 |

OTHER PUBLICATIONS

Carry–Lite Hunting Decoys catalog, 4 pgs from Web site: http://www.carrylitedecoys.com/geese.html.

* cited by examiner

Primary Examiner—Michael J. Carone
Assistant Examiner—T. Nguyen
(74) Attorney, Agent, or Firm—Smith, Gambrell & Russell

(57) ABSTRACT

A feeding flock decoy assembly having at least one decoy apparatus and an actuator for generating a natural motion in the decoy apparatus. The decoy assembly includes a fowl body that is pivotally supported on a mounting stake, which is further supported by a support brace positioned below the fowl body. The support brace includes a brace eyelet and a guide loop, wherein a cord is attached to the fowl body and directed through the body to a guide ring mounted on the fowl body. The cord is further directed downwardly through the guide loop to be attached to the an actuating disc attached to the actuator. The actuator has a handle that supports the actuating disc, and the actuator controls the movement of a handle. When the actuator is activated, the handle will pull and release the cord, thereby generating motion in the fowl body on the mounting stake to provide the appearance of a feeding bird.

17 Claims, 7 Drawing Sheets

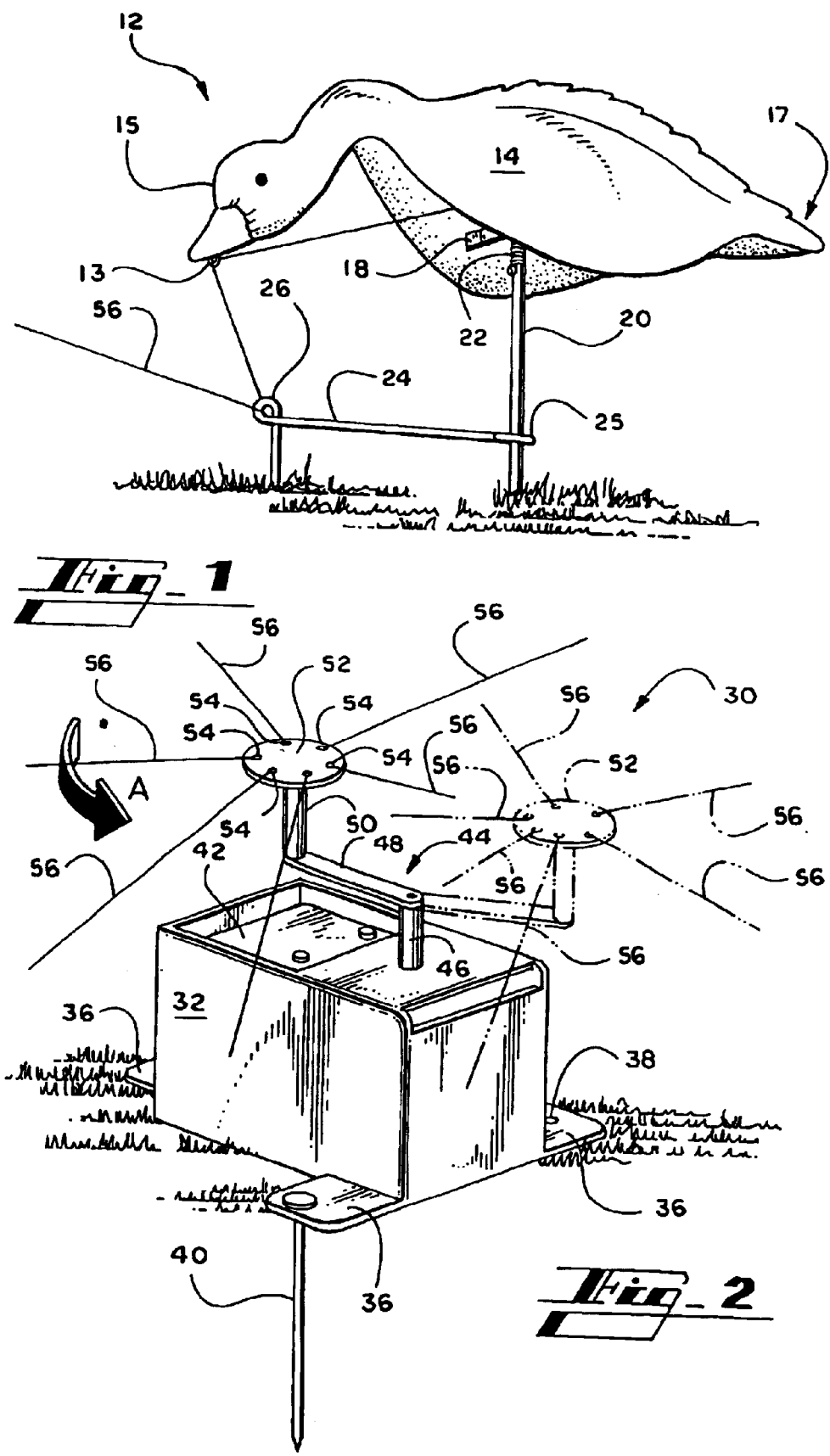

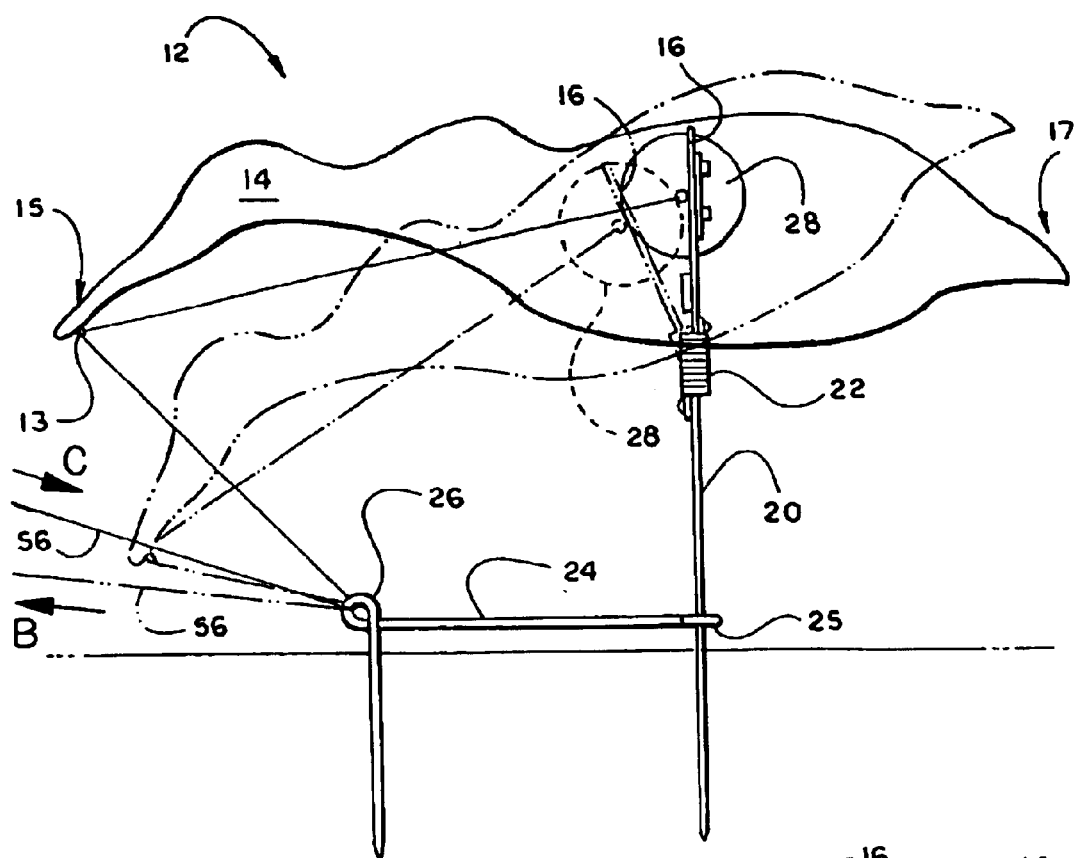
Fig_3
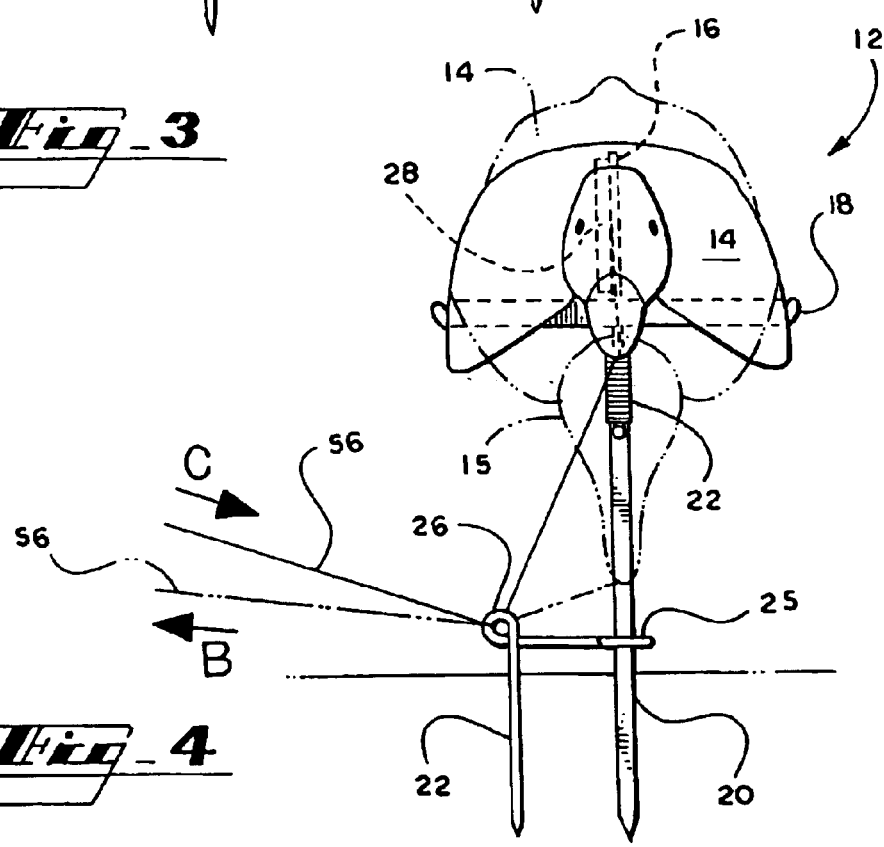
Fig_4

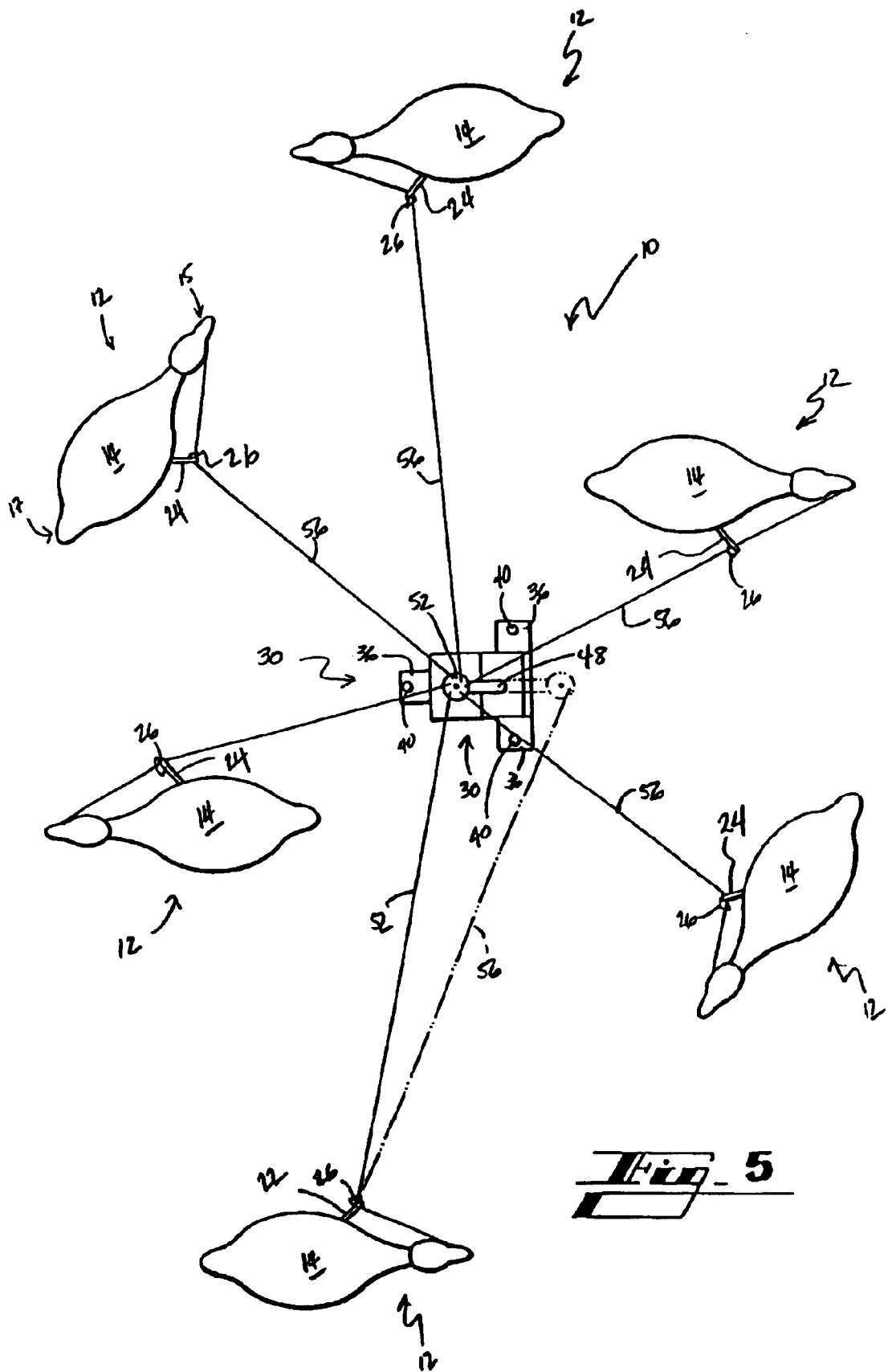

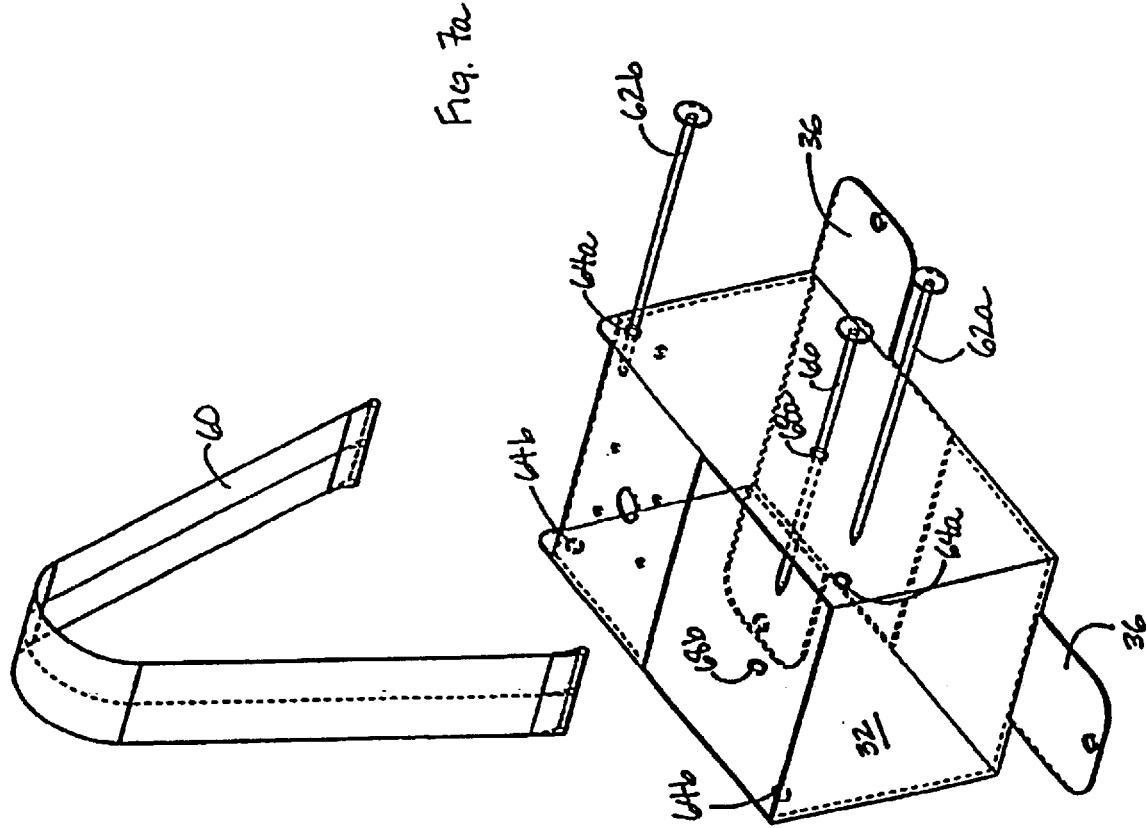

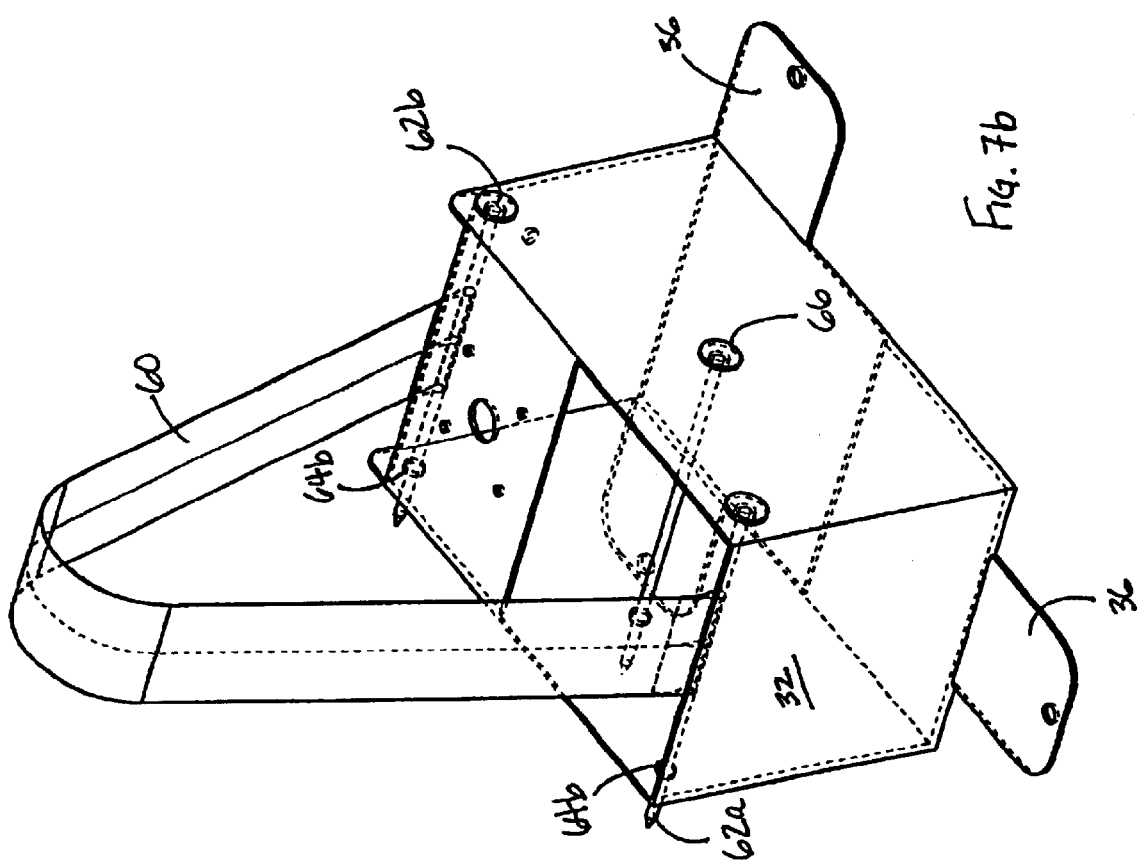

US 6,834,458 B1

FEEDING FLOCK DECOY ASSEMBLY

FIELD OF THE INVENTION

The present invention relates to hunting decoys. More specifically, the present invention relates to a dynamic hunting decoy apparatus that provides life-like movement of one or more decoys to attract wildlife.

BACKGROUND OF THE INVENTION

The use of decoys by outdoorsmen to attract fowl is commonly known in the art. Such decoys are designed to have the appearance of wildlife, and they are commonly used in water and on land to provide the natural appearance of a flock of birds. As a result, the decoys attract other wildlife to the location of the congregation of the birds. Historically, great efforts have been exerted to make the decoys closely imitate and simulate the appearance and size of actual birds. As a result, decoys are presently available for almost all breeds of birds that look substantially identical to a live bird.

While designers have created a variety of decoys that have a realistic and natural appearance, it is additionally beneficial to create movement of the decoy such that the decoy simulates the natural motion of the fowl in addition to the appearance. Prior designs that simulate bird movement, however, have resulted either in complicated designs that are difficult to produce or designs that produce unrealistic movement, not like the actual motion of a bird. Moreover, the construction and relocation of such designs is complicated and cumbersome for the outdoorsmen as well.

What is desired, then, and not found in the prior art, is a decoy assembly that provides a realistic decoy having natural movement that is simple to assemble and operate for the outdoorsman.

SUMMARY OF THE INVENTION

It is an object of the present invention to provide feeding flock decoy assembly providing the realistic appearance of a flock of birds.

It is a further object of the present invention to provide a feeding flock decoy assembly that generates a realistic feeding motion in the various decoys.

It is yet a further object of the present invention to provide a feeding flock decoy assembly that is simple for an outdoorsman to transport and assemble in a natural setting.

The present feeding flock decoy assembly meets the objectives set forth above by including at least one decoy apparatus and an actuating means for generating a natural motion in the decoy apparatus. The decoy apparatus includes a fowl body that is pivotally supported on a mounting stake, which is further supported by a support brace positioned below the fowl body. The support brace includes a stake loop and a guide loop, and a cord is attached to the fowl body and directed through the guide loop in the support brace to be attached to the actuating means. Once the cord is connected, the actuating means is activated to providing a pulling motion and releasing motion on the cord, thereby generating movement in the fowl body on the mounting stake. These and other objects and advantages of the invention will become apparent from the following detailed description of the preferred embodiment of the invention.

BRIEF DESCRIPTION OF THE DRAWINGS

A feeding flock decoy assembly embodying features of the invention is described in the accompanying drawings which form a portion of this disclosure and wherein:

FIG. 1 is a perspective view of a feeding flock decoy assembly used in the present invention;

FIG. 2 is a perspective view of the actuating means of the feeding flock decoy assembly of the present invention;

FIG. 3 is a side elevational view of a decoy used in the feeding flock decoy assembly of the present invention;

FIG. 4 is a front elevational view of the decoy used in the feeding flock decoy assembly of the present invention;

FIG. 5 is a top plan view of the feeding flock decoy assembly of the present invention;

FIG. 7a is an exploded view of the housing of the feeding flock decoy assembly of the present invention and a strap;

FIG. 7b is a perspective view of the housing of the feeding flock decoy assembly of the present invention with a strap attached thereto.

DESCRIPTION OF THE PREFERRED EMBODIMENTS

Figure 6:
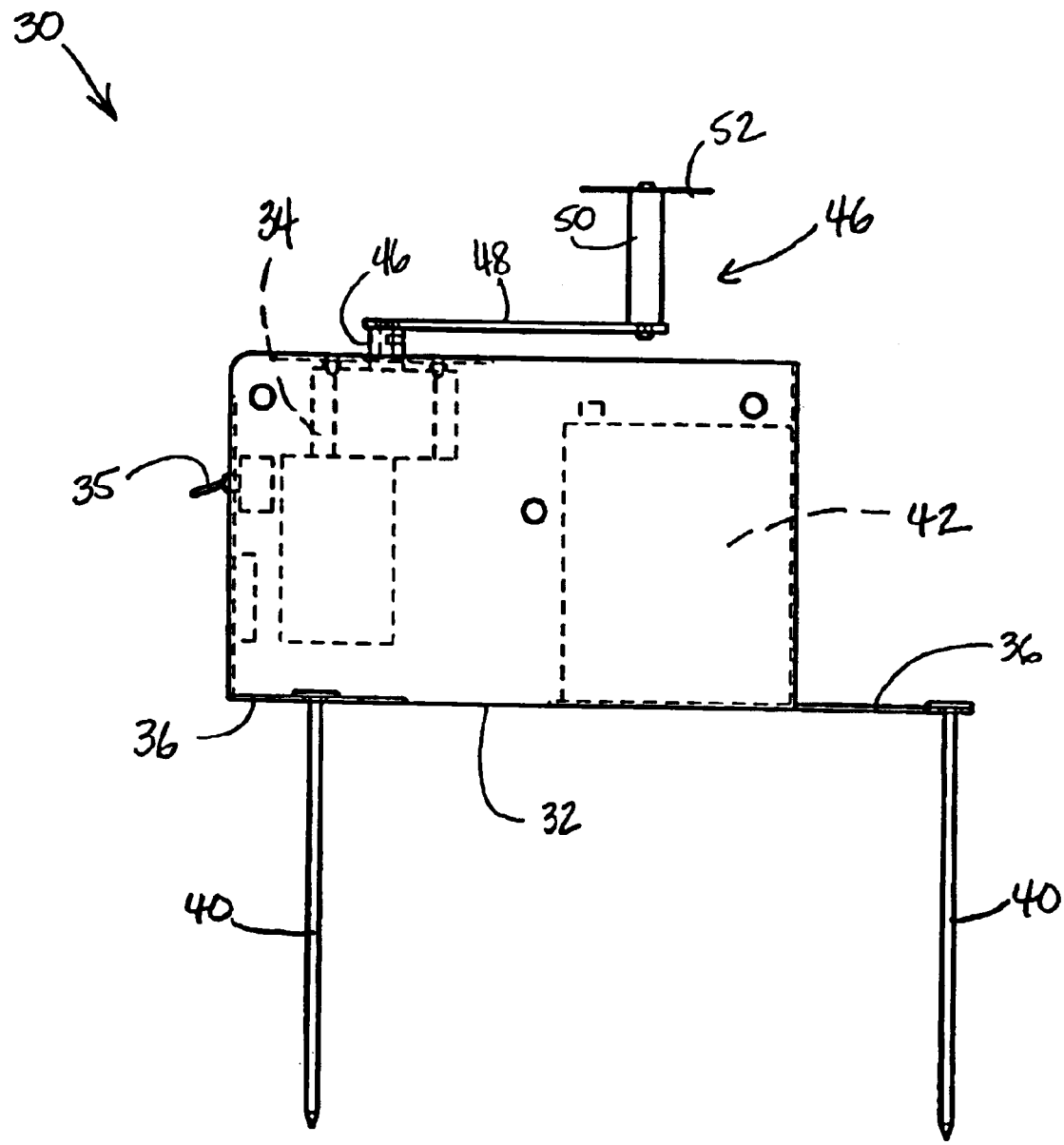
FIG. 6 is a side sectional view of the actuating means of the feeding flock decoy assembly of the present invention.
Figure 8:
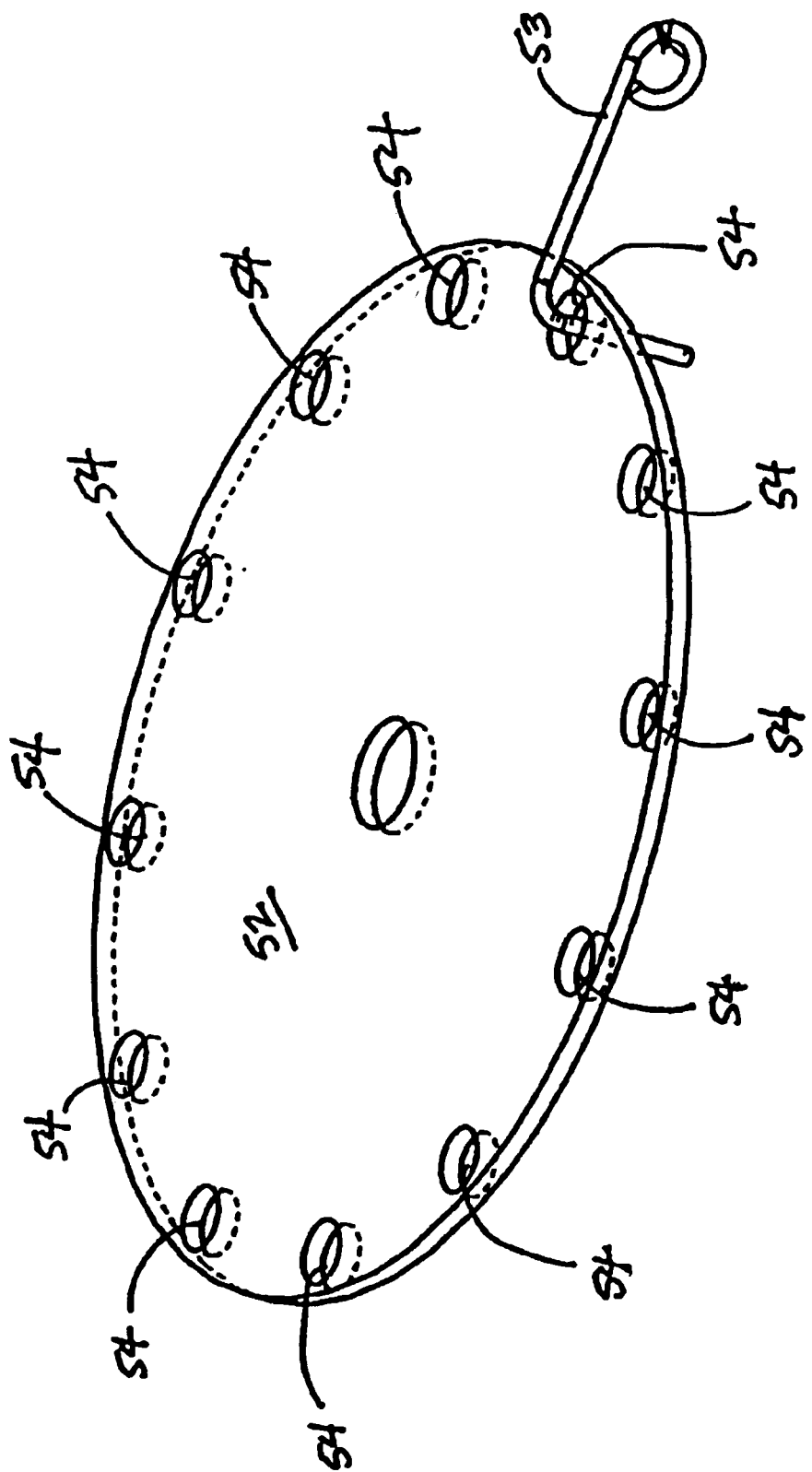
FIG. 8 is a perspective view of an actuating disc and connecting pin of the present invention.

Looking now to FIGS. 1–8, the feeding flock decoy assembly 10 of the present invention is illustrated. The feeding flock decoy assembly 10 includes at least one decoy apparatus 12 and actuating means 30 for generating natural movement of the decoy apparatus 12. The decoy apparatus 12 includes a fowl shell 14 or body having a head end 15 and a tail end 17. The fowl shell 14 is preferably supported by a vertical brace 16 and an attached horizontal brace 18, and includes a guide ring 13 attached to the head end 15 of the fowl shell 14.

Looking at FIGS. 3 and 4, the decoy apparatus 12 is further illustrated as including a mounting stake 20 that is pivotally connected with the vertical brace 16, preferably by a spring 22 or a related embodiment for a pivoting member. A spring 22 is chosen to allow the free movement of the fowl shell 14. The mounting stake 20 supporting the fowl shell 14 is used in conjunction with a support stake 24, wherein the support stake 24 includes a stake loop 25 and a guide loop 26. The mounting stake 30 is inserted through the stake loop 25 to provide support for the mounting stake 30. Finally, the decoy-apparatus 12 may also include a retractable cord dispenser 28, which can be mechanically connected to the fowl shell 14 in numerous varying points and positions. The retractable cord dispenser 28 will provide for the distribution of a cord 56, the use of which will be described herein. In the embodiment shown in FIG. 1, the retractable cord dispenser 28 is in the form of an auto-retraction disc, which provides a recoil of the cord 56 to allow the user to extend or retract the cord 56, thereby setting the tension in the cord 56 as desired.

FIGS. 2, 5 and 6 provide an illustration of the actuating means 30 of the assembly. The preferred embodiment of the actuating means 30 includes a housing 32 that surrounds an actuator 34. The actuator 34 is preferably a rotary actuator, such as a gear motor. The housing 32 includes a series of flanges 36 having circular cavities 38 traversing through each flange 36. As a result, fastening stakes 40 can be driven through each cavity 38 to secure the housing 32 to a ground surface. The actuating means 30 also includes a power source 42, such as a battery, that is positioned within the housing 32 for protection and connected to the actuator 34 via a switch 35. The switch 35 is attached to the housing 32 and is connected between the power source 42 and the actuator 34. As a result, the switch 36 will control operation of the actuating means 30, and the user may easily activate or turn off the actuating means 30 by engaging the switch 36. It should also be noted that other methods for activating the actuating means 30 are foreseen in the art, such as the use of a remote sensor that may be employed by the user to control the actuating means 30.

In the embodiment illustrated in FIGS. 2 and 6, the actuating means 30 is shown having a handle 44 that is connected to the actuator 34. The handle 44 comprises a motor arm 46 that is connected to the actuator 34, a disc arm 50, and a connecting rod 48 joining the motor arm 46 with the disc arm 50. In the preferred embodiment, the handle 44 will be rotated by the actuator 34 such that the disc arm 50 revolves in a circular fashion around the motor arm 46.

The actuating means 30 additionally includes an actuating disc 52 that is attached to the disc arm 50 opposite the connecting rod 48. The actuating disc 52 preferably includes a series of small apertures 54 positioned along the perimeter of the actuating disc 52. The apertures 54 act as a means for connecting the decoy apparatus 12 with the actuating means 30, and any number of other attachment means for connecting the decoy apparatus 12 with the actuating means 30 may be incorporated in the present invention. Referring to the preferred embodiment, the actuating disc 52 may have any number of apertures 54 that are preferably positioned around the perimeter of the actuating disc 52. However, to operate most efficiently, the actuating disc 52 must have at least one aperture 54 for each two embodiments of the decoy apparatus 12 to be connected to the actuating means 30.

As is shown in FIG. 5, the decoy apparatus 12 is preferably connected to the actuating means 30 using cord 56, although any flexible medium for connecting the decoy apparatus 12 to the actuating means 30 may be employed. In the preferred embodiment, the cord 56 is attached to the retractable cord dispenser 28 that is resolutely connected with the vertical brace 16 (see FIGS. 3 and 4). However, it should be noted that the cord 56 may be attached to the vertical brace 16 by any number of related means, and the cord 56 may even be directly joined with the vertical brace 16 or the surface of the fowl shell 14. The cord 56 thereby extends from the vertical brace 16 and preferably traverses the guide ring 13 affixed to the head end 15 of the fowl shell 14. From the guide ring 13, the cord 56 preferably traverses the guide loop 26 of the support brace 24 and is then attached to the actuating disc 52 of the actuating means 30.

At the actuating means 30, the cord 56 may be attached to the actuating disc 52 in any number of ways. For example, the end of the cord 56 may simply be tied to the apertures 54 of the actuating disc 52 to provide a sturdy connection. Alternatively, looking to FIG. 8, a connecting pin 53 may be attached to the end of the cord 56 to simplify the construction of the feeding flock decoy assembly 10. In particular, the connecting pin 53 may be used to quickly and easily engage any one of the apertures 54 of the actuating disc 52 and provide a steadfast connection of the cord 56. Additionally, the connecting pin 53 may be easily detached from the actuating disc 52.

To initially construct the decoy assembly 10, the user will begin by positioning the support brace 24 in a ground surface and directing the mounting stake 20, with the fowl shell 14 attached thereto, through the brace eyelet 25 of the support brace 24 into the ground surface. Once the mounting stake 20 and the fowl shell 14 are securely in place, the user will then draw the cord 56 from the retractable cord dispenser 28 through the fowl shell 14 to engage and traverse the guide ring 13. From the guide ring 13, the cord 56 will then traverse the guide loop 26, which is positioned at an elevation lower than that of the guide ring 13. The cord 56 is then drawn to the actuating disc 52 where the final connection is made to join the decoy apparatus 12 with the actuating means 30.

The user will then activate switch 33 to set the actuator 34 in motion. The actuator 34 will cause the motor arm 46 of the handle 44 to rotate in direction A (see FIG. 2), such that the disc arm 50 will rotate around the motor arm 46. The actuating disc 52 will likewise orbit the motor arm 46 along a circular path, such that the cord 56 will gradually be tightened and pulled in direction C (see FIGS. 3 and 4) during half of the rotation, and the cord 56 will gradually be loosened in direction B during the remaining half of the rotation. It should be noted that the length of the motor arm 46 may be varied as desired by the user to improve the operation of the assembly 10 and to limit any opportunities for entanglements by the various cords 56.

Continuing to look at FIGS. 3 and 4, when the cord 56 is pulled in direction B, the head end 15 of the fowl shell 14 will be pulled downwardly toward the stake loop 26. More specifically, when the cord 56 is pulled in direction B the fowl shell 14 will be pivoted downwardly as the spring 22 is bowed However, as the actuating disc 52 completes its circular revolution, the cord 56 will no longer be drawing the fowl shell 14 in a downward direction, and therefore the spring 22 will retract to move the fowl shell 14 into an upright position. Accordingly, when the cord 56 moves in direction C, the head end 15 of the fowl shell 14 move back into a relaxed and erect position. The result is that the fowl shell 14 will follow a motion that imitates the natural movement of a bird that is feeding from a ground surface, thereby indicating to other birds that a food source is present and attracting the other birds to the feeding site.

In addition, to create a realistic feeding movement of the fowl shell 14, the user may position the support brace 24 at an angle offset from the centerline of the fowl shell 14, as shown in FIG. 4. By placing the support brace 24 at an offset angle, the cord 56 will draw the head end 15 of the fowl shell 14 at a downward angle. Such movement mimics the that of an actual bird, and thereby further helps to attract other birds to the site of the assembly 10.

Referring to FIG. 5, it is illustrated that more than one decoy apparatus 12 may be connected to a single actuation means 30. In particular, the number of fowl shells 14 that can be connected with the actuating disc 52 depends on the number of disc apertures 54 provided in the actuating disc 52. In the embodiment shown in FIG. 5, there are six disc apertures 54, and six embodiments of the decoy apparatus 12 are connected to each disc aperture 54. Additionally, certain embodiments of the present invention would allow for two embodiments of the decoy apparatus 12 to be attached to a single disc aperture 54. Consequently, embodiments as shown in FIG. 5 would allow for operation of twelve embodiments of the decoy apparatus 12 rather than simply six. Moreover, it should be noted that the tension in the various cords 56 between the actuating disc 52 and the fowl shells 14 will remain tight such that the cords 56 will not be tangled amongst themselves.

It should be noted that although the preferred embodiment provides for the use of a retractable cord dispenser 28 to control the length of cord 56 between the decoy apparatus 12 and the actuating assembly 30, a single cord 56 may be used to provide the desired connection. However, the use of the retractable cord dispenser 28 allows the user to individually adjust the length of the cord 56 between each decoy apparatus 12 and the actuating assembly 30, such that the movement of each independent decoy apparatus 12 may be varied. This will adjust the movement of each decoy apparatus 12 to provide a natural feeding appearance to birds flying above.

FIGS. 7a and 7b illustrate that the housing 32 is designed to be easily transported by the user. In particular, a strap 60 may be included to assist the user in moving the housing 32 and the components contained therein. The strap 60 is preferably connected to the housing 32 using two pins 62a, 62b that traverse strap apertures 64a, 64b. The pins 62a, 62b pass through strap apertures 64a, and further pass through the ends of the strap 60 to finally traverse strap apertures 64b (see FIG. 7b). Thus, the user can simply attach the strap 60 to the housing 32 for simple transportation of the housing 32, and the strap 60 can be easily removed to allow desired operation of the present invention. In a similar fashion, a stabilizing pin 66 may be inserted through central apertures 68a, 68b to provide a means for steadying the power source 42 during the transport of the housing 32 and contents thereof.

Finally, the present invention is designed such that the actuating means 30 is inconspicuous when in operation. Therefore, the housing 32 may be designed to have a camouflaged outer appearance. The camouflaged outer appearance of the housing 32 will aid in disguising the operation of the actuating means 30 from the wildlife targeted for attraction to each decoy apparatus 12.

Thus, although there have been described particular embodiments of the present invention of a new and useful FEEDING FLOCK DECOY ASSEMBLY, it is not intended that such references be constructed as limitations upon the scope of this invention except as set forth in the following claims.

What is claimed is:

1. A feeding flock decoy assembly comprising:
   a fowl body pivotally supported by a mounting stake, said fowl body having a head end and a tail end;
   an actuator;
   an actuating disc;
   a handle connected to said actuator, said handle having a motor arm connected to said actuator, a disc arm connected to said actuating disc; and a connecting rod connecting said motor arm with said disc arm, wherein said actuator drives said handle in a circular orbit; and
   a cord connecting said actuating disc with said fowl body, wherein said actuator controls the pivoting movement of said fowl body.

2. The feeding flock decoy assembly as described in claim 1 wherein said actuating disc includes at least one aperture traversing said actuating disc to receive at least one cord.

3. The feeding flock decoy assembly as described in claim 2 further comprising a connecting pin attached to said cord, said connecting pin detachably engaging said aperture of said actuating disc.

4. The feeding flock decoy assembly as described in claim 1 further comprising:
   a power source; and
   a switch connected between said power source and said actuator to control distribution of power to said actuator.

5. The feeding flock decoy assembly as described in claim 4 further comprising: a housing surrounding said actuator and said power source.

6. The feeding flock decoy assembly as described in claim 5 further comprising a strap removably attached to said housing.

7. The feeding flock decoy assembly as described in claim 1 further comprising a retractable cord dispenser connected to said mounting stake, said dispenser distributing said cord to connect with said actuating disc.

8. The feeding flock decoy assembly as described in claim 1 further comprising a spring connected between said fowl body and said mounting stake.

9. The feeding flock decoy assembly as described in claim 1 further comprising
   a support brace having a brace eyelet and a guide loop, said mounting stake traversing said brace eyelet; and
   a guide ring attached to said head end of said fowl body;
   wherein said cord extends from said fowl body through said guide ring and said guide loop to connect with said actuating disc.

10. An animated decoy for attracting wildlife, said animated decoy comprising:
    a substantially fowl-shaped body having a head end and a tail end;
    mounting means for pivotally supporting said fowl-shaped body;
    actuating means for pivoting said head end between a lowered position and a raised position;
    a cord connecting said fowl-shaped body with said actuating means;
    a support brace having a brace eyelet, said mounting means engaging said brace eyelet; and guide means for directing the attachment of said cord between said fowl body and said actuating means.

11. The animated decoy as described in claim 10 wherein said actuating means comprises:
    a motor;
    a handle connected to said motor, wherein said motor rotates said handle; and
    an actuating disc connected to said handle, said cord connecting said actuating disc with said fowl body.

12. The animated decoy as described in claim 11 wherein said handle comprises:
    a motor arm connected to said motor;
    a disc arm connected to said actuating disc; and
    a connecting rod connecting said motor arm with said disc arm.

13. The animated decoy as described in claim 10, said mounting means comprising:
    a vertical brace connected to said fowl body; and
    a spring connected between said vertical brace and said mounting stake.

14. A feeding flock decoy assembly comprising:
    a first decoy apparatus having a first fowl body with a head end and a tail end;
    a stationary first mount flexibly supporting said first decoy apparatus;
    a second decoy apparatus having a second fowl bode with a head end and a tail end;
    a stationary second mount flexibly supporting said second decoy apparatus;
    an actuator;
    a first cord connecting said actuator with said first fowl body; and
    a second cord connecting said actuator with said second fowl body;

wherein said actuator concomitantly controls the tension of said first cord and said second cord to generate pivotal movement of said first decoy apparatus about said first mount and said second decoy apparatus about said second mount.

15. The feeding flock decoy assembly as described in claim 14, further comprising:
   a handle connected to said actuator, wherein said actuator drives said handle in a circular orbit; and
   an actuating disc connected to said handle, said first cord connecting said actuating disc with said first fowl body and said second cord connecting said actuating disc with said second fowl body.

16. The feeding flock decoy assembly as described in claim 15 wherein said handle comprises;
   a motor arm connected to said actuator;
   a disc arm connected to said actuating disc; and
   a connecting rod connecting said motor arm with said disc arm.

17. The feeding flock decoy assembly as described in claim 14 further comprising:
   a first guide ring attached to said head end of said first decoy apparatus and a second guide ring attached to said head end of said second decoy apparatus: and
   a first support brace having a first brace eyelet and a first guide loop, said first mount traversing said first brace eyelet;
   a second support brace having a second brace eyelet and a second guide loop, said second mount traversing said second brace eyelet; and
   wherein said first cord extends from said first fowl body through said first guide ring and said first guide loop to connect with said actuating disc and said second cord extends from said second fowl body through said second guide ring and said second guide loon to connect with said actuating disc.

* * * * *